US012208421B2

(12) United States Patent
Garcia, Jr. et al.

(10) Patent No.: US 12,208,421 B2
(45) Date of Patent: Jan. 28, 2025

(54) METAL SEPARATION IN A SCRAP YARD

(71) Applicant: Sortera Alloys, Inc., Fort Wayne, IN (US)

(72) Inventors: Manuel Gerardo Garcia, Jr., Fort Wayne, IN (US); Nalin Kumar, Fort Worth, TX (US)

(73) Assignee: SORTERA TECHNOLOGIES, INC., Markle, IN (US)

( * ) Notice: Subject to any disclaimer, the term of this patent is extended or adjusted under 35 U.S.C. 154(b) by 152 days.

(21) Appl. No.: 17/972,507

(22) Filed: Oct. 24, 2022

(65) Prior Publication Data

US 2023/0044783 A1 Feb. 9, 2023

Related U.S. Application Data

(60) Continuation-in-part of application No. 17/752,669, filed on May 24, 2022, which is a continuation-in-part of application No. 17/667,397, filed on Feb. 8, 2022, now Pat. No. 11,969,764, which is a continuation-in-part of application No. 17/495,291, filed on Oct. 6, 2021, now Pat. No. 11,975,365, which is a continuation-in-part of application No. 17/491,415, filed on Sep. 30, 2021, now Pat. No. 11,278,937, which is a continuation-in-part of (Continued)

(51) Int. Cl.

| | |
|---|---|
| ***B07C 5/34*** | (2006.01) |
| ***B07C 5/342*** | (2006.01) |
| *B07C 5/04* | (2006.01) |

(52) U.S. Cl.

CPC .............. *B07C 5/3422* (2013.01); *B07C 5/34* (2013.01); *B07C 5/342* (2013.01); *B07C 5/04* (2013.01); *B07C 2501/0054* (2013.01)

(58) Field of Classification Search

CPC .. B07C 5/04; B07C 5/34; B07C 5/342; B07C 5/3422; B07C 2501/0054

USPC .......................................................... 209/577

See application file for complete search history.

(56) References Cited

U.S. PATENT DOCUMENTS

| | | | |
|---|---|---|---|
| 2,194,381 | A | 9/1937 | Cadman |
| 2,417,878 | A | 2/1944 | Luzietti et al. |

(Continued)

FOREIGN PATENT DOCUMENTS

| | | | | |
|---|---|---|---|---|
| BR | PI0210794-5 B1 | 7/2002 | | |
| CA | 2893877 | 12/2015 | | |
| CA | 3065962 A1 * | 6/2020 | ............. | B07C 5/342 |
| CN | 1283319 | 2/2001 | | |
| CN | 200953004 | 9/2007 | | |
| CN | 201440132 | 4/2010 | | |
| CN | 201464390 | 5/2010 | | |
| CN | 101776620 A | 7/2010 | | |
| CN | 201552461 | 7/2010 | | |
| CN | 102861722 | 1/2013 | | |

(Continued)

OTHER PUBLICATIONS

European Patent Office; Extended European Search Report for corresponding EP 19792330.3; Apr. 30, 2021; 7 pages; Munich, DE.

(Continued)

*Primary Examiner* — Terrell H Matthews
(74) *Attorney, Agent, or Firm* — Kelly Kordzik

(57) ABSTRACT

An apparatus for classifying materials utilizing a vision system, which may implement an artificial intelligence system in order to identify or classify each of the materials, which may then be separated from a heap in a scrap yard into separate groups, such as other heaps, based on such an identification or classification. The artificial intelligence system may utilize a neural network, and be previously trained to recognize and classify certain types of materials.

20 Claims, 6 Drawing Sheets

Related U.S. Application Data application No. 17/380,928, filed on Jul. 20, 2021, which is a continuation-in-part of application No. 17/227,245, filed on Apr. 9, 2021, now Pat. No. 11,964,304, which is a continuation-in-part of application No. 16/939,011, filed on Jul. 26, 2020, now Pat. No. 11,471,916, which is a continuation-in-part of application No. 16/852,514, filed on Apr. 19, 2020, now Pat. No. 11,260,426, which is a continuation of application No. 16/375,675, filed on Apr. 4, 2019, now Pat. No. 10,722,922, which is a division of application No. 16/358,374, filed on Mar. 19, 2019, now Pat. No. 10,625,304, which is a continuation-in-part of application No. 15/963,755, filed on Apr. 26, 2018, now Pat. No. 10,710,119, which is a continuation-in-part of application No. 15/213,129, filed on Jul. 18, 2016, now Pat. No. 10,207,296.

(60) Provisional application No. 63/273,535, filed on Oct. 29, 2021, provisional application No. 62/490,219, filed on Apr. 26, 2017, provisional application No. 62/193,332, filed on Jul. 16, 2015.

(56) References Cited

U.S. PATENT DOCUMENTS 2,942,792 A 7/1957 Anderson et al.
2,953,554 A 9/1960 Miller et al.
3,512,638 A 5/1970 Chengges et al.
3,662,874 A 5/1972 Muller
3,791,518 A 2/1974 Vanderhoof
3,955,678 A 5/1976 Moyer
3,973,736 A 8/1976 Nilsson
3,974,909 A 8/1976 Johnson
4,004,681 A 1/1977 Clewett et al.
4,031,998 A 6/1977 Suzuki et al.
4,044,897 A 8/1977 Maxted
4,253,154 A 2/1981 Russ et al.
4,317,521 A 3/1982 Clark et al.
4,413,721 A 11/1983 Bollier
4,488,610 A 12/1984 Yankloski
4,586,613 A 5/1986 Horii
4,572,735 A 12/1986 Poetzschke et al.
4,726,464 A 2/1988 Canziani
4,834,870 A 5/1989 Osterberg et al.
4,848,590 A 7/1989 Kelly
5,016,039 A * 5/1991 Sosa .................... G03B 7/097 396/50
5,042,947 A 8/1991 Pötzschke et al.
5,054,601 A 10/1991 Sjogren et al.
5,114,230 A 5/1992 Pryor
5,236,092 A 8/1993 Krotkov et al.
5,260,576 A 11/1993 Sommer, Jr. et al.
5,410,637 A 4/1995 Kern et al.
5,433,311 A 7/1995 Bonnet
5,462,172 A 10/1995 Kumagai et al.
5,570,773 A 11/1996 Bonnet
5,663,997 A 9/1997 Willis et al.
5,676,256 A 10/1997 Kumar et al.
5,733,592 A 3/1998 Wettstein et al.
5,738,224 A 4/1998 Sommer, Jr. et al.
5,836,436 A 11/1998 Fortenbery et al.
5,911,327 A 6/1999 Tanaka et al.
6,064,476 A 5/2000 Goltsos
6,076,653 A 6/2000 Bonnet
6,100,487 A 8/2000 Schultz et al.
6,124,560 A * 9/2000 Roos .................... B07C 5/361 209/587
6,148,990 A 11/2000 Lapeyre et al.
6,266,390 B1 7/2001 Sommer, Jr. et al.
6,273,268 B1 8/2001 Axmann
6,313,422 B1 11/2001 Anibas
6,313,423 B1 * 11/2001 Sommer ................ B07C 5/366 209/579
6,412,642 B2 7/2002 Charles et al.
6,421,042 B1 * 7/2002 Omura ................ G06F 3/04842 345/157
6,457,859 B1 10/2002 Lu et al.
6,519,315 B2 2/2003 Sommer, Jr. et al.
6,545,240 B2 4/2003 Kumar
6,795,179 B2 9/2004 Kumar
6,888,917 B2 5/2005 Sommer, Jr. et al.
6,983,035 B2 1/2006 Price et al.
7,073,651 B2 7/2006 Costanzo et al.
7,099,433 B2 8/2006 Sommer et al.
7,200,200 B2 4/2007 Laurila et al.
7,341,154 B2 3/2008 Boer
7,564,943 B2 7/2009 Sommer, Jr. et al.
7,616,733 B2 11/2009 Sommer et al.
7,674,994 B1 3/2010 Valerio
7,763,820 B1 7/2010 Sommer, Jr. et al.
7,802,685 B2 9/2010 Allen
7,848,484 B2 12/2010 Sommer, Jr. et al.
7,886,915 B2 2/2011 Shulman
7,903,789 B2 3/2011 Morton et al.
7,978,814 B2 7/2011 Sommer et al.
7,991,109 B2 8/2011 Golenhofen
8,073,099 B2 12/2011 Niu et al.
8,144,831 B2 3/2012 Sommer, Jr. et al.
8,172,069 B2 5/2012 Prakasam
8,429,103 B1 4/2013 Aradhye et al.
8,433,121 B2 4/2013 Kosarev
8,476,545 B2 7/2013 Sommer et al.
8,553,838 B2 10/2013 Sommer et al.
8,567,587 B2 10/2013 Faist et al.
8,576,988 B2 11/2013 Lewalter et al.
8,600,545 B2 12/2013 Earlam
8,615,123 B2 * 12/2013 Dabic .................... G07D 5/005 382/136
8,654,919 B2 2/2014 Sabol et al.
8,855,809 B2 10/2014 Spencer et al.
8,903,040 B2 12/2014 Maeyama et al.
9,156,162 B2 10/2015 Suzuki
9,316,596 B2 4/2016 Levesque
9,424,635 B2 8/2016 Killmann
9,514,590 B2 12/2016 Lindbichler
9,785,851 B1 10/2017 Torek et al.
9,927,354 B1 * 3/2018 Starr .................. G01N 21/3581
9,956,609 B1 5/2018 De Saro
10,088,425 B2 5/2018 Buckley
10,005,107 B2 6/2018 Ogusu
10,036,142 B2 * 7/2018 Bamber .................... B07C 5/34
10,207,296 B2 * 2/2019 Garcia ...................... B07C 5/34
10,295,451 B2 5/2019 Schneider
10,467,477 B2 11/2019 Gershtein
10,478,861 B2 11/2019 Comtois et al.
10,486,209 B2 11/2019 Wimmer
10,710,119 B2 * 7/2020 Kumar .................... G06N 3/08
10,722,922 B2 7/2020 Kumar et al.
10,799,915 B2 10/2020 Horowitz et al.
10,824,936 B2 11/2020 Wu
10,967,404 B2 4/2021 Grof
11,278,937 B2 3/2022 Kumar et al.
2002/0141006 A1 10/2002 Pocius et al.
2002/0186882 A1 12/2002 Cotman
2003/0038064 A1 2/2003 Harbeck et al.
2003/0147494 A1 8/2003 Sommer, Jr. et al.
2003/0151746 A1 8/2003 Sperling et al.
2004/0151364 A1 8/2004 Kenneway et al.
2004/0235970 A1 11/2004 Smith
2006/0239401 A1 10/2006 Sommer, Jr. et al.
2006/0256341 A1 11/2006 Kuwada
2007/0029232 A1 * 2/2007 Cowling .............. B07C 5/3425 209/577
2007/0262000 A1 11/2007 Valerio
2008/0029445 A1 2/2008 Russcher et al.
2008/0041501 A1 2/2008 Platek
2008/0092922 A1 4/2008 Dick
2008/0257795 A1 10/2008 Shuttleworth
2008/0302707 A1 12/2008 Bourely
2009/0292422 A1 11/2009 Eiswerth

(56) References Cited

U.S. PATENT DOCUMENTS

| | | | | |
|---|---|---|---|---|
| 2010/0017020 | A1* | 1/2010 | Hubbard-Nelson | B07C 5/346 700/230 |
| 2010/0091272 | A1 | 4/2010 | Asada et al. | |
| 2010/0195795 | A1 | 8/2010 | Golenhofen | |
| 2010/0264070 | A1 | 10/2010 | Sommer, Jr. et al. | |
| 2010/0282646 | A1 | 11/2010 | Looy et al. | |
| 2011/0017644 | A1 | 1/2011 | Valerio | |
| 2011/0083871 | A1 | 4/2011 | Lalancette et al. | |
| 2011/0181873 | A1 | 7/2011 | Yavets-Chen et al. | |
| 2011/0247730 | A1* | 10/2011 | Yanar | B22D 21/007 148/552 |
| 2012/0148018 | A1 | 6/2012 | Sommer, Jr. et al. | |
| 2012/0288058 | A1 | 11/2012 | Maeyama et al. | |
| 2013/0028487 | A1 | 1/2013 | Stager et al. | |
| 2013/0079918 | A1 | 3/2013 | Spencer et al. | |
| 2013/0092609 | A1 | 4/2013 | Andersen | |
| 2013/0126399 | A1 | 5/2013 | Wolff et al. | |
| 2013/0184853 | A1* | 7/2013 | Roos | B07C 5/346 378/53 |
| 2013/0229510 | A1 | 9/2013 | Killmann | |
| 2013/0264249 | A1 | 10/2013 | Sommer, Jr. et al. | |
| 2013/0304254 | A1* | 11/2013 | Torek | B07C 5/3416 700/223 |
| 2015/0012226 | A1* | 1/2015 | Skaff | G01N 21/55 702/22 |
| 2015/0050548 | A1 | 2/2015 | Meissner | |
| 2015/0092922 | A1 | 4/2015 | Liu et al. | |
| 2015/0170024 | A1 | 6/2015 | Chatterjee et al. | |
| 2015/0254532 | A1 | 9/2015 | Talathi et al. | |
| 2015/0336135 | A1 | 11/2015 | Corak | |
| 2016/0016201 | A1* | 1/2016 | Schons | B07B 1/14 209/658 |
| 2016/0022892 | A1 | 1/2016 | Eifler et al. | |
| 2016/0059450 | A1 | 3/2016 | Meredith | |
| 2016/0136694 | A1* | 5/2016 | Janda | G01N 15/1434 209/576 |
| 2016/0180626 | A1 | 6/2016 | Young | |
| 2016/0250665 | A1 | 9/2016 | Lampe | |
| 2016/0299091 | A1 | 10/2016 | Bamber et al. | |
| 2016/0346811 | A1 | 12/2016 | Iino | |
| 2017/0014868 | A1 | 1/2017 | Garcia, Jr. | |
| 2017/0232479 | A1* | 8/2017 | Pietzka | B07C 5/342 209/3.3 |
| 2017/0261437 | A1 | 9/2017 | Buchter | |
| 2018/0065155 | A1 | 3/2018 | Ripley | |
| 2018/0243800 | A1* | 8/2018 | Kumar | G06N 20/00 |
| 2019/0091729 | A1 | 3/2019 | Gillner | |
| 2019/0130560 | A1 | 5/2019 | Horowitz et al. | |
| 2019/0210067 | A1 | 7/2019 | Kumar et al. | |
| 2019/0247891 | A1 | 8/2019 | Kumar et al. | |
| 2019/0299255 | A1* | 10/2019 | Chaganti | G06V 20/52 |
| 2020/0034661 | A1 | 1/2020 | Kim | |
| 2020/0050922 | A1 | 2/2020 | Wu | |
| 2020/0084966 | A1 | 3/2020 | Corban | |
| 2020/0290088 | A1 | 9/2020 | Kumar et al. | |
| 2020/0361659 | A1 | 11/2020 | Whitman | |
| 2020/0368786 | A1 | 11/2020 | Kumar et al. | |
| 2021/0001377 | A1 | 1/2021 | Sutton | |
| 2021/0094075 | A1 | 4/2021 | Horowitz et al. | |
| 2021/0217156 | A1 | 7/2021 | Zabble | |
| 2021/0229133 | A1 | 7/2021 | Kumar et al. | |
| 2021/0346916 | A1 | 11/2021 | Kumar et al. | |
| 2022/0016675 | A1 | 1/2022 | Kumar et al. | |
| 2022/0023918 | A1 | 1/2022 | Kumar et al. | |
| 2022/0161298 | A1 | 5/2022 | Kumar et al. | |
| 2022/0168781 | A1 | 6/2022 | Kumar et al. | |
| 2022/0203407 | A1 | 6/2022 | Kumar et al. | |
| 2022/0245402 | A1 | 8/2022 | Tae | |
| 2022/0355342 | A1 | 11/2022 | Kumar et al. | |
| 2022/0371057 | A1 | 11/2022 | Kumar et al. | |
| 2023/0011383 | A1 | 1/2023 | Balthasar | |
| 2023/0044783 | A1 | 2/2023 | Garcia, Jr. et al. | |
| 2023/0053268 | A1 | 2/2023 | Garcia, Jr. et al. | |
| 2023/0169751 | A1 | 6/2023 | Geurts | |
| 2023/0173543 | A1 | 6/2023 | Kumar et al. | |
| 2023/0176028 | A1 | 6/2023 | Kumar et al. | |
| 2024/0109103 | A1 | 4/2024 | Kumar et al. | |
| 2024/0116084 | A1 | 4/2024 | Gagliardi | |
| 2024/0149304 | A1 | 5/2024 | Kumar et al. | |
| 2024/0228180 | A9 | 7/2024 | Chellappan et al. | |
| 2024/0228181 | A9 | 7/2024 | Chellappan et al. | |

FOREIGN PATENT DOCUMENTS

| | | | | | |
|---|---|---|---|---|---|
| CN | 103501925 | | | 1/2014 | |
| CN | 103745901 | | | 4/2014 | |
| CN | 101776620 | B | | 6/2014 | |
| CN | 103955707 | | | 7/2014 | |
| CN | 203688493 | | | 7/2014 | |
| CN | 204359695 | | | 5/2015 | |
| CN | 204470139 | | | 7/2015 | |
| CN | 204495749 | | | 7/2015 | |
| CN | 204537711 | | | 8/2015 | |
| CN | 204575572 | | | 8/2015 | |
| CN | 104969266 | | | 10/2015 | |
| CN | 106000904 | | | 10/2016 | |
| CN | 107403198 | | | 11/2017 | |
| CN | 107552412 | | | 1/2018 | |
| CN | 107552412 | A | * | 1/2018 | B07C 5/342 |
| CN | 107790398 | | | 3/2018 | |
| CN | 111659635 | | | 9/2020 | |
| CN | 211888005 | U | | 11/2020 | |
| DE | 202009006383 | | | 9/2009 | |
| EP | 0011892 | | | 11/1983 | |
| EP | 0074447 | | | 1/1987 | |
| EP | 0433828 | A2 | | 12/1990 | |
| EP | 0351778 | B1 | | 10/1993 | |
| EP | 2243089 | A1 | | 10/2010 | |
| EP | 3263234 | | | 1/2018 | |
| JP | H07-275802 | | | 10/1995 | |
| JP | 2010-172799 | | | 8/2010 | |
| JP | 5083196 | | | 11/2012 | |
| JP | 5969685 | | | 7/2016 | |
| JP | 2017-109197 | | | 6/2017 | |
| JP | 2021163078 | | | 10/2021 | |
| RU | 2004101401 | | | 2/2005 | |
| RU | 2006136756 | | | 4/2008 | |
| RU | 2339974 | | | 11/2008 | |
| RU | 2361194 | | | 7/2009 | |
| TW | I707812 | | | 10/2020 | |
| WO | WO9920048 | | | 4/1999 | |
| WO | WO2001/022072 | | | 3/2001 | |
| WO | WO2009/039284 | | | 3/2009 | |
| WO | WO2011/159269 | | | 12/2011 | |
| WO | WO2012/094568 | | | 7/2012 | |
| WO | WO2013/033572 | | | 3/2013 | |
| WO | WO2013/180922 | | | 12/2013 | |
| WO | WO2015/195988 | | | 12/2015 | |
| WO | WO2016/199074 | | | 12/2016 | |
| WO | WO2017/001438 | | | 1/2017 | |
| WO | WO2017/011835 | | | 1/2017 | |
| WO | WO-2017011835 | A1 | * | 1/2017 | B07C 5/10 |
| WO | WO2017/221246 | | | 12/2017 | |
| WO | WO2018/091617 | | | 5/2018 | |
| WO | WO-2019241114 | A1 | * | 12/2019 | B07C 5/3422 |
| WO | WO2021/089602 | | | 5/2021 | |
| WO | WO2021/126876 | | | 6/2021 | |
| WO | WO-2021126876 | A1 | * | 6/2021 | B07C 5/342 |
| WO | WO2019/180438 | | | 9/2022 | |
| WO | WO2023/137423 | | | 7/2023 | |

OTHER PUBLICATIONS

India Patent Office; Office Action issued for corresponding India Application Serial No. 201937044046; Jun. 4, 2020; 7 pages; IN.

United States International Searching Authority; International Search Report & Written Opinion for PCT/US2016/042850; Sep. 28, 2016; 15 pages; Alexandria, VA; US.

International Alloy Designations and Chemical Composition Limits for Wrought Aluminum and Wrought Aluminum Alloys, the Aluminum Association, Inc., revised Jan. 2015, 38 pages.

(56) References Cited

OTHER PUBLICATIONS

International Searching Authority, International Search Report and the Written Opinion, International Application No. PCT/US2016/042850, Sep. 28, 2016.
The International Bureau of WIPO, International Preliminary Report on Patentability, International Application No. PCT/US2016/42850, Jan. 25, 2018.
The United States Patent and Trademark Office, Non-Final Office Action, U.S. Appl. No. 15/213,129, filed Oct. 6, 2017.
International Searching Authority, International Search Report and the Written Opinion, International Application No. PCT/US2018/029640, Jul. 23, 2018; 23 pages; Alexandria, VA; US.
European Patent Office; Extended Search Report for 16825313.6; Jan. 28, 2019; 12 pages; Munich, DE.
India Patent Office; Office Action issued for corresponding India Application Serial No. 201817002365; Mar. 12, 2020; 6 pages; IN.
International Searching Authority, International Search Report and the Written Opinion, International Application No. PCT/US2019/022995, Jun. 5, 2019; 10 pages; Alexandria, VA; US.
U.S. Appl. No. 15/213,129, filed Jul. 18, 2016.
International Searching Authority, International Search Report and the Written Opinion of the International Searching Authority, International Application No. PCT/US2016/45349, Oct. 17, 2016.
The United States Patent and Trademark Office, Non-Final Office Action, U.S. Appl. No. 16/375,675, filed Jun. 28, 2019.
The United States Patent and Trademark Office, Final Office Action, U.S. Appl. No. 16/375,675, filed Jan. 17, 2020.
United States International Searching Authority; International Search Report & Written Opinion for PCT/US2022/015693; May 6, 2022; 9 pages; Alexandria, VA; US.
United States International Searching Authority; International Search Report & Written Opinion for PCT/US2022/015665; May 23, 2022; 10 pages; Alexandria, VA; US.
Chinese Patent Office; Office Action issued for corresponding Chinese Application No. 201980043725.X on Apr. 28, 2022; 21 pages; Beijing, CN.
United States International Searching Authority; International Search Report & Written Opinion for PCT/US2022/020657; Jun. 16, 2022; 10 pages; Alexandria, VA.
Bishop, Christopher M.; Neural Networks for Pattern Recognition; 494 pages; Clarendon Press; 1995; Oxford, UK.
United States International Searching Authority; International Search Report & Written Opinion for PCT/US2022/016869; Jun. 29, 2022; 11 pages; Alexandria, VA.
Alipour et al; Point-to-Point Stable Motion Planning of Wheeled Mobile Robots with Multiple Arms for Heavy Object Manipulation; 2011 IEEE International Conference on Robotics and Automation; Shanghai International Conference Center; May 9-13, 2011; Shanghai, CN.
Wikipedia; Articulated Robot; Retrieved from: "https://en.wikipedia.org/w/index.php?title=Articulated_robot&oldid=1090219198"; 3 pages; May 28, 2022; US.
Wikipedia: Industrial robot: Retrieved from https://en.wikipedia.org/w/index.php?title=Industrial_robot&oldid=1095073173; 14 pages; Jun. 26, 2022; US.
Wikipedia: Robotic arm: Retrieved from https://en.wikipedia.org/w/index.php?title=Robotic_arm&oldid=1093448239; 4 pages; Jun. 16, 2022; US.
Zhou et al., "SSA-CNN: Semantic Self-Attention CNN for Pedestrian Detection," ArXiv: 1902.09080v3, Jun. 6, 2019, pp. 4321-4330.
Zhang et al., "Designing and verifying a disassembly line approach to cope with the upsurge of end-of-life vehicles in China," Elsevier, Waste Management (2018), vol. 76, Jun. 2018, pp. 697-707. Retrieved on Jul. 10, 2022 from <https://isiarticles.com/budles/Article/pre/pdf/98926.pdf>.
Japan Patent Office; Office Action issued Jan. 10, 2023 for Serial No. 2021-509947; 9 pages (with translation).
International Searching Authority, International Search Report and the Written Opinion of the International Searching Authority, International Application No. PCT/US2022/035011, Oct. 27, 2022; 9 pages.
United States International Searching Authority; International Search Report & Written Opinion for PCT/US2022/060626; May 2, 2023; 12 pages.
United States International Searching Authority; International Search Report & Written Opinion for PCT/US2022/051681; Mar. 20, 2023; 6 pages.
United States International Searching Authority; International Search Report & Written Opinion for PCT/US2022/039622; Oct. 28, 2022; 12 pages.
United States International Searching Authority; International Search Report & Written Opinion for PCT/US2022/035013; Sep. 23, 2022; 7 pages.
Mach Vision New High Technology Equipment—Machinex, Jun. 8, 2021, downloaded from https://www.machinexrecycling.com/news/mach-vision-new-high-technology-equipment/, 1 page.
BHS and NRT Introduce Max-AITM; Bulk Handling Systems (BHS); Apr. 18, 2017; downloaded from https://max-ai.com/autonomous-qc/ on Apr. 18, 2024.
Gao et al., "Applying Improved Optical Recognition with Machine Learning on Sorting Cu Impurities in Steel Scrap," Journal of Sustainable Metallurgy, vol. 6, pp. 785-795, Dec. 7, 2020.
United States International Searching Authority; International Search Report & Written Opinion for PCT/US2022/030943; Sep. 28, 2022; 10 pages; Alexandria, VA.
The United States Patent and Trademark Office, Non-Final Office Action, U.S. Appl. No. 16/358,374, filed Jun. 28, 2019.
The United States Patent and Trademark Office, Non-Final Office Action, U.S. Appl. No. 16/358,374, filed Dec. 12, 2019.
The United States Patent and Trademark Office, Non-Final Office Action, U.S. Appl. No. 15/963,755, filed Apr. 5, 2019.
The United States Patent and Trademark Office, Non-Final Office Action, U.S. Appl. No. 15/963,755, filed Sep. 13, 2019.
The United States Patent and Trademark Office, Non-Final Office Action, U.S. Appl. No. 15/963,755, filed May 11, 2020.
The United States Patent and Trademark Office, Non-Final Office Action, U.S. Appl. No. 17/491,415, filed Nov. 15, 2021.
The United States Patent and Trademark Office, Non-Final Office Action, U.S. Appl. No. 17/673,694, filed Jan. 25, 2024.
The United States Patent and Trademark Office, Non-Final Office Action, U.S. Appl. No. 17/696,831, filed Mar. 29, 2024.
The United States Patent and Trademark Office, Non-Final Office Action, U.S. Appl. No. 17/495,291, filed Oct. 27, 2023.
United States International Searching Authority; International Search Report & Written Opinion for PCT/US2024/017756; Jun. 17, 2024; 12 pages.
United States International Searching Authority; International Search Report & Written Opinion for PCT/US2024/017762; Jun. 17, 2024; 15 pages.
United States International Searching Authority; International Search Report & Written Opinion for PCT/US2023/077485; Feb. 21, 2024; 9 pages.
Taiwan Patent Office; Office Action dated Jun. 5, 2024 for Serial No. 111107059; 25 pages (with translation).
United States International Searching Authority; International Search Report & Written Opinion for PCT/US2022/047614; Feb. 21, 2023; 8 pages.

* cited by examiner

METAL SEPARATION IN A SCRAP YARD

RELATED PATENTS AND PATENT APPLICATIONS

This application claims priority to U.S. Provisional Patent Application Ser. No. 63/273,535. This application is a continuation-in-part application of U.S. patent application Ser. No. 17/752,669, which is a continuation-in-part application of U.S. patent application Ser. No. 17/667,397, which is a continuation-in-part application of U.S. patent application Ser. No. 17/495,291, which is a continuation-in-part application of U.S. patent application Ser. No. 17/491,415 (issued as U.S. Pat. No. 11,278,937), which is a continuation-in-part application of U.S. patent application Ser. No. 17/380,928, which is a continuation-in-part application of U.S. patent application Ser. No. 17/227,245, which is a continuation-in-part application of U.S. patent application Ser. No. 16/939,011 (issued as U.S. Pat. No. 11,471,916), which is a continuation application of U.S. patent application Ser. No. 16/375,675 (issued as U.S. Pat. No. 10,722,922), which is a continuation-in-part application of U.S. patent application Ser. No. 15/963,755 (issued as U.S. Pat. No. 10,710,119), which is a continuation-in-part application of U.S. patent application Ser. No. 15/213,129 (issued as U.S. Pat. No. 10,207,296), which claims priority to U.S. Provisional Patent Application Ser. No. 62/193,332, all of which are hereby incorporated by reference herein. U.S. patent application Ser. No. 17/491,415 (issued as U.S. Pat. No. 11,278,937) is a continuation-in-part application of U.S. patent application Ser. No. 16/852,514 (issued as U.S. Pat. No. 11,260,426), which is a divisional application of U.S. patent application Ser. No. 16/358,374 (issued as U.S. Pat. No. 10,625,304), which is a continuation-in-part application of U.S. patent application Ser. No. 15/963,755 (issued as U.S. Pat. No. 10,710,119), which claims priority to U.S. Provisional Patent Application Ser. No. 62/490,219, all of which are hereby incorporated by reference herein.

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the separation of materials, and in particular, to the classifying and/or sorting of materials gathered over a large area, such as in a metal scrap yard.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling is the process of collecting and processing materials that would otherwise be thrown away as trash, and turning them into new products. Recycling has benefits for communities and for the environment, since it reduces the amount of waste sent to landfills and incinerators, conserves natural resources, increases economic security by tapping a domestic source of materials, prevents pollution by reducing the need to collect new raw materials, and saves energy.

After collection, recyclables are generally sent to a material recovery facility to be sorted, cleaned, and processed into materials that can be used in manufacturing. As a result, high throughput automated sorting platforms that economically sort highly mixed waste streams would be beneficial throughout various industries. Thus, there is a need for cost-effective sorting platforms that can identify, analyze, and separate mixed industrial or municipal waste streams with high throughput to economically generate higher quality feedstocks (which may also include lower levels of trace contaminants) for subsequent processing. Typically, material recovery facilities are either unable to discriminate between many materials, which limits the scrap to lower quality and lower value markets, or too slow, labor intensive, and inefficient, which limits the amount of material that can be economically recycled or recovered.

Scrap metals are often shredded, and thus require sorting to facilitate reuse of the metals. By sorting the scrap metals, metal is reused that may otherwise go to a landfill. Additionally, use of sorted scrap metal leads to reduced pollution and emissions in comparison to refining virgin feedstock from ore. Scrap metals may be used in place of virgin feedstock by manufacturers if the quality of the sorted metal meets certain standards. The scrap metals may include types of ferrous and nonferrous metals, heavy metals, high value metals such as nickel or titanium, cast or wrought metals, and other various alloys.

DETAILED DESCRIPTION

Figure 1:
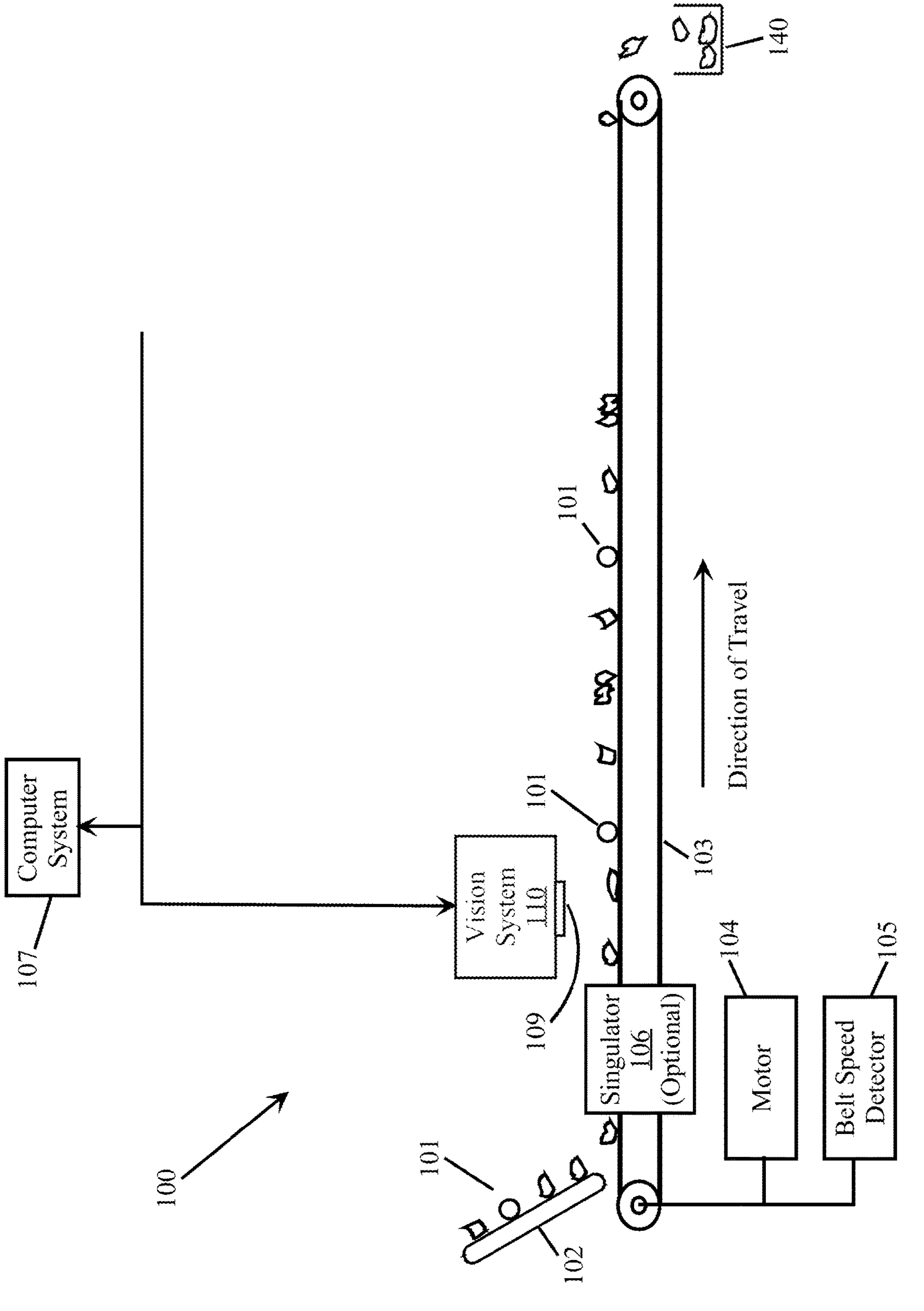
FIG. 1 illustrates a schematic of a material handling system, which may be utilized to train an artificial intelligence ("AI") system in accordance with embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

Embodiments of the present disclosure utilize an artificial intelligence ("AI")/vision system configured to identify/classify various metal alloys that have been collected in a scrap yard.

As used herein, "materials" may include any item or object, including but not limited to, metals (ferrous and nonferrous), metal alloys, scrap metal alloy pieces, heavies, Zorba, Twitch, pieces of metal embedded in another different material, plastics (including, but not limited to, any of the plastics disclosed herein, known in the industry, or newly created in the future), rubber, foam, glass (including, but not limited to, borosilicate or soda lime glass, and various colored glass), ceramics, paper, cardboard, Teflon, PE, bundled wires, insulation covered wires, rare earth elements, leaves, wood, plants, parts of plants, textiles, bio-waste, packaging, electronic waste, batteries and accumulators, scrap from end-of-life vehicles, mining, construction, and demolition waste, crop wastes, forest residues, purpose-grown grasses, woody energy crops, microalgae, urban food waste, food waste, hazardous chemical and biomedical wastes, construction debris, farm wastes, biogenic items, non-biogenic items, objects with a specific carbon content, any other objects that may be found within municipal solid waste, and any other objects, items, or materials disclosed herein, including further types or classes of any of the foregoing that can be distinguished from each other, including but not limited to, by one or more sensor systems, including but not limited to, any of the sensor technologies disclosed herein.

In a more general sense, a "material" may include any item or object composed of a chemical element, a compound or mixture of one or more chemical elements, or a compound or mixture of a compound or mixture of chemical elements, wherein the complexity of a compound or mixture may range from being simple to complex (all of which may also be referred to herein as a material having a specific "chemical composition"). "Chemical element" means a chemical element of the periodic table of chemical elements, including chemical elements that may be discovered after the filing date of this application. Within this disclosure, the terms "scrap," "scrap pieces," "materials," and "material pieces" may be used interchangeably. As used herein, a material piece or scrap piece referred to as having a metal alloy composition is a metal alloy having a specific chemical composition that distinguishes it from other metal alloys.

As used herein, a "pile" of materials refers to a heap of things laid on or lying one on top of another. As used herein, a "heap" of things is usually untidy, and often has the shape of a hill or mound.

As used herein, the term "chemical signature" refers to a unique pattern (e.g., fingerprint spectrum), as would be produced by one or more analytical instruments, indicating the presence of one or more specific elements or molecules (including polymers) in a sample. The elements or molecules may be organic and/or inorganic. Such analytical instruments include any of the sensor systems disclosed herein, and also disclosed in U.S. patent application Ser. No. 17/667,397, which is hereby incorporated by reference herein. In accordance with embodiments of the present disclosure, one or more such sensor systems may be configured to produce a chemical signature of a material piece.

As well known in the industry, a "polymer" is a substance or material composed of very large molecules, or macromolecules, composed of many repeating subunits. A polymer may be a natural polymer found in nature or a synthetic polymer. "Multilayer polymer films" are composed of two or more different polymer compositions. The layers are at least partially contiguous and preferably, but optionally, coextensive. As used herein, the terms "plastic," "plastic piece," and "piece of plastic material" (all of which may be used interchangeably) refer to any object that includes or is composed of a polymer composition of one or more polymers and/or multilayer polymer films.

As used herein, a "fraction" refers to any specified combination of organic and/or inorganic elements or molecules, polymer types, plastic types, polymer compositions, chemical signatures of plastics, physical characteristics of the plastic piece (e.g., color, transparency, strength, melting point, density, shape, size, manufacturing type, uniformity, reaction to stimuli, etc.), etc., including any and all of the various classifications and types of plastics disclosed herein. Non-limiting examples of fractions are one or more different types of plastic pieces that contain: LDPE plus a relatively high percentage of aluminum; LDPE and PP plus a relatively low percentage of iron; PP plus zinc; combinations of PE, PET, and HDPE; any type of red-colored LDPE plastic pieces; any combination of plastic pieces excluding PVC; black-colored plastic pieces; combinations of #3-#7 type plastics that contain a specified combination of organic and inorganic molecules; combinations of one or more different types of multi-layer polymer films; combinations of specified plastics that do not contain a specified contaminant or additive; any types of plastics with a melting point greater than a specified threshold; any thermoset plastic of a plurality of specified types; specified plastics that do not contain chlorine; combinations of plastics having similar densities; combinations of plastics having similar polarities; plastic bottles without attached caps or vice versa.

As used herein, the term "predetermined" refers to something that has been established or decided in advance, such as by a user of embodiments of the present disclosure.

As used herein, "spectral imaging" is imaging that uses multiple bands across the electromagnetic spectrum. While a typical camera captures images composed of light across three wavelength bands in the visible spectrum, red, green, and blue (RGB), spectral imaging encompasses a wide variety of techniques that include and go beyond RGB. For example, spectral imaging may use the infrared, visible, ultraviolet, and/or x-ray spectrums, or some combination of the above. Spectral data, or spectral image data, is a digital data representation of a spectral image. Spectral imaging may include the acquisition of spectral data in visible and non-visible bands simultaneously, illumination from outside the visible range, or the use of optical filters to capture a specific spectral range. It is also possible to capture hundreds of wavelength bands for each pixel in a spectral image. As used herein, the term "image data packet" refers to a packet of digital data pertaining to a captured spectral image of an individual material piece.

As used herein, the terms "identify" and "classify," the terms "identification" and "classification," and any derivatives of the foregoing, may be utilized interchangeably. As used herein, to "classify" a material piece is to determine (i.e., identify) a type or class of materials to which the material piece belongs. For example, in accordance with certain embodiments of the present disclosure, a sensor system (as further described herein) may be configured to collect and analyze any type of information for classifying materials and distinguishing such classified materials from other materials, which classifications can be utilized within a separation apparatus to selectively separate material pieces as a function of a set of one or more physical and/or chemical characteristics (e.g., which may be user-defined), including but not limited to, color, texture, hue, shape, brightness, weight, density, chemical composition, size, uniformity, manufacturing type, chemical signature, predetermined fraction, radioactive signature, transmissivity to light, sound, or other signals, and reaction to stimuli such as various fields, including emitted and/or reflected electromagnetic radiation ("EM") of the material pieces.

The types or classes (i.e., classification) of materials may be user-definable (e.g., predetermined) and not limited to any known classification of materials. The granularity of the types or classes may range from very coarse to very fine. For example, the types or classes may include plastics, ceramics, glasses, metals, and other materials, where the granularity of such types or classes is relatively coarse; different metals and metal alloys such as, for example, zinc, copper, brass, chrome plate, and aluminum, where the granularity of such types or classes is finer; or between specific types of metal alloys, where the granularity of such types or classes is relatively fine. Thus, the types or classes may be configured to distinguish between materials of significantly different chemical compositions such as, for example, plastics and metal alloys, or to distinguish between materials of almost identical chemical compositions such as, for example, different types of metal alloys. It should be appreciated that the methods and systems discussed herein may be applied to accurately identify/classify material pieces for which the chemical composition is completely unknown before being classified.

As used herein, "manufacturing type" refers to the type of manufacturing process by which the material piece was manufactured, such as a metal part having been formed by a wrought process, having been cast (including, but not limited to, expendable mold casting, permanent mold casting, and powder metallurgy), having been forged, a material removal process, etc.

As used herein, a heterogeneous mixture of a plurality of material pieces contains at least one material piece having a chemical composition different from one or more other material pieces, and/or at least one material piece within this heterogeneous mixture is physically distinguishable from other material pieces, and/or at least one material piece within this heterogeneous mixture is of a class or type of material different from the other material pieces within the mixture, and the apparatuses and methods are configured to identify/classify/distinguish/separate this material piece into a group separate from such other material pieces. By way of contrast, a homogeneous set or group of materials all fall within the same identifiable class or type of material.

Embodiments of the present disclosure may be described herein as separating material pieces (e.g., different metal alloys) into such separate groups by physically separating the material pieces into separate heaps, piles, receptacles, or bins as a function of user-defined or predetermined groupings (e.g., material type classifications). As an example, within certain embodiments of the present disclosure, material pieces may be separated into separate heaps or receptacles in order to separate material pieces classified as belonging to a certain class or type of material that are distinguishable from other material pieces (for example, which are classified as belonging to a different class or type of material).

It should be noted that the materials to be separated may have irregular sizes and shapes. For example, such material may have been previously run through some sort of shredding mechanism that chops up the materials into such irregularly shaped and sized pieces (producing scrap pieces).

Though embodiments of the present disclosure will be described with respect to the separation of different steel alloys, the present disclosure is not limited as such, but is applicable to the identification and/or separation of any classes/types of materials that may be collected in groups, heaps, or piles, such as within a warehouse or in a scrap yard. The terms "alloy steel" and "steel alloy" refer to steels with other alloying elements added in addition to carbon. Common alloyants include manganese (Mn), nickel (Ni), chromium (Cr), molybdenum (Mo), vanadium (V), silicon (Si), and boron (B). Less common alloyants include aluminum (Al), cobalt (Co), copper (Cu), cerium (Ce), niobium (Nb), titanium (Ti), tungsten (W), tin (Sn), zinc (Zn), lead (Pb), and zirconium (Zr).

Figure 4:
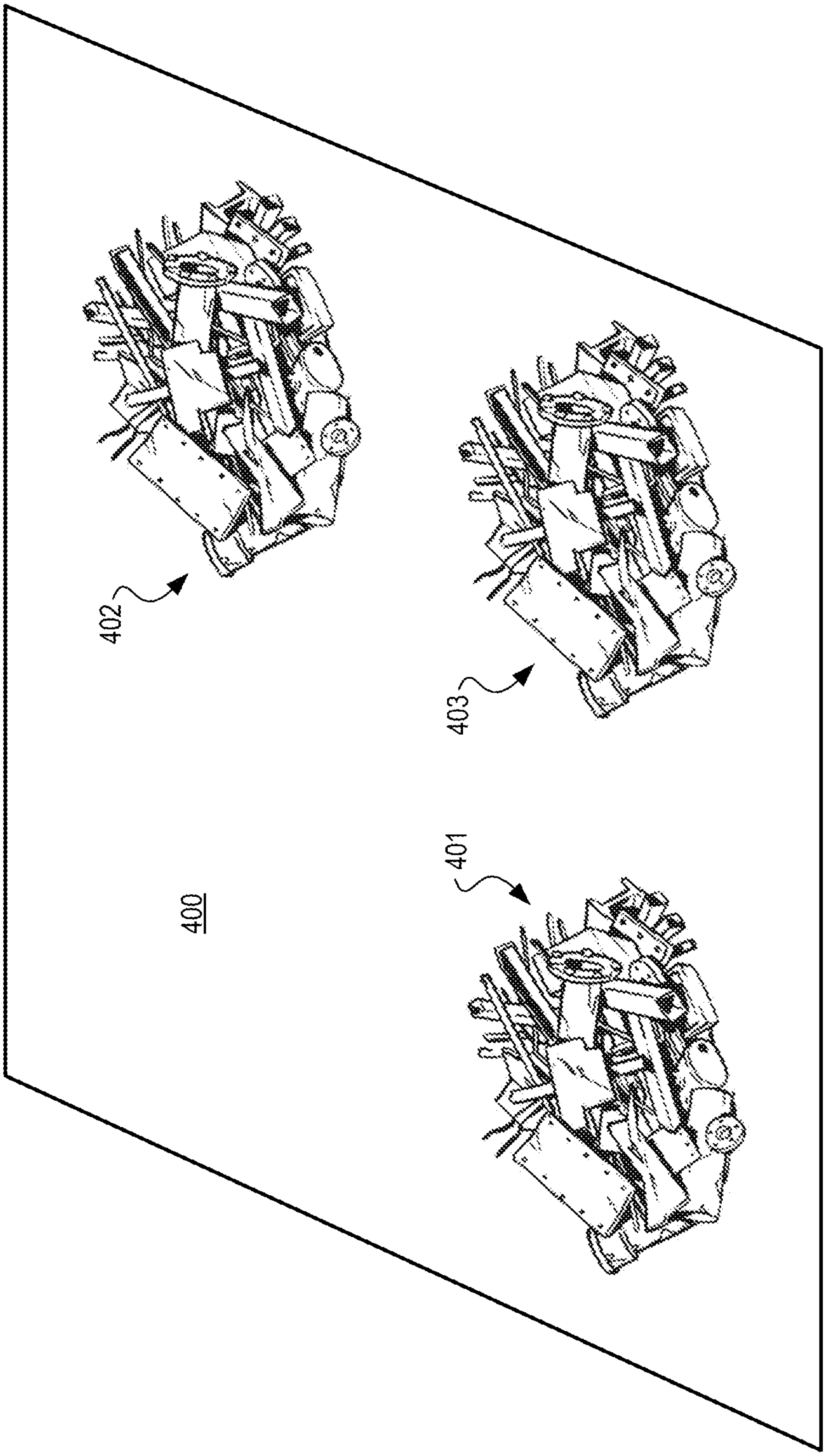
FIG. 4 depicts heaps of metal scrap that has been collected within a scrap yard.

For example, FIG. 4 depicts an exemplary scrap yard 400 containing N (N≥1) heaps 401 . . . 403 of mixtures of different types of steel alloy scrap pieces in each heap. A non-limiting advantage of the present disclosure is that it provides for the separation of large metal pieces before they are shredded into much smaller pieces, which can enable the separation of metal alloys before such mixture of metal alloys are shredded into much smaller pieces, many of which may be discarded or shredded into such small dimensions that they are essentially lost and not effectively recycled. Such large metal pieces can even be as large as engine blocks or large portions of engine blocks, steel beams, etc.

Figure 6:
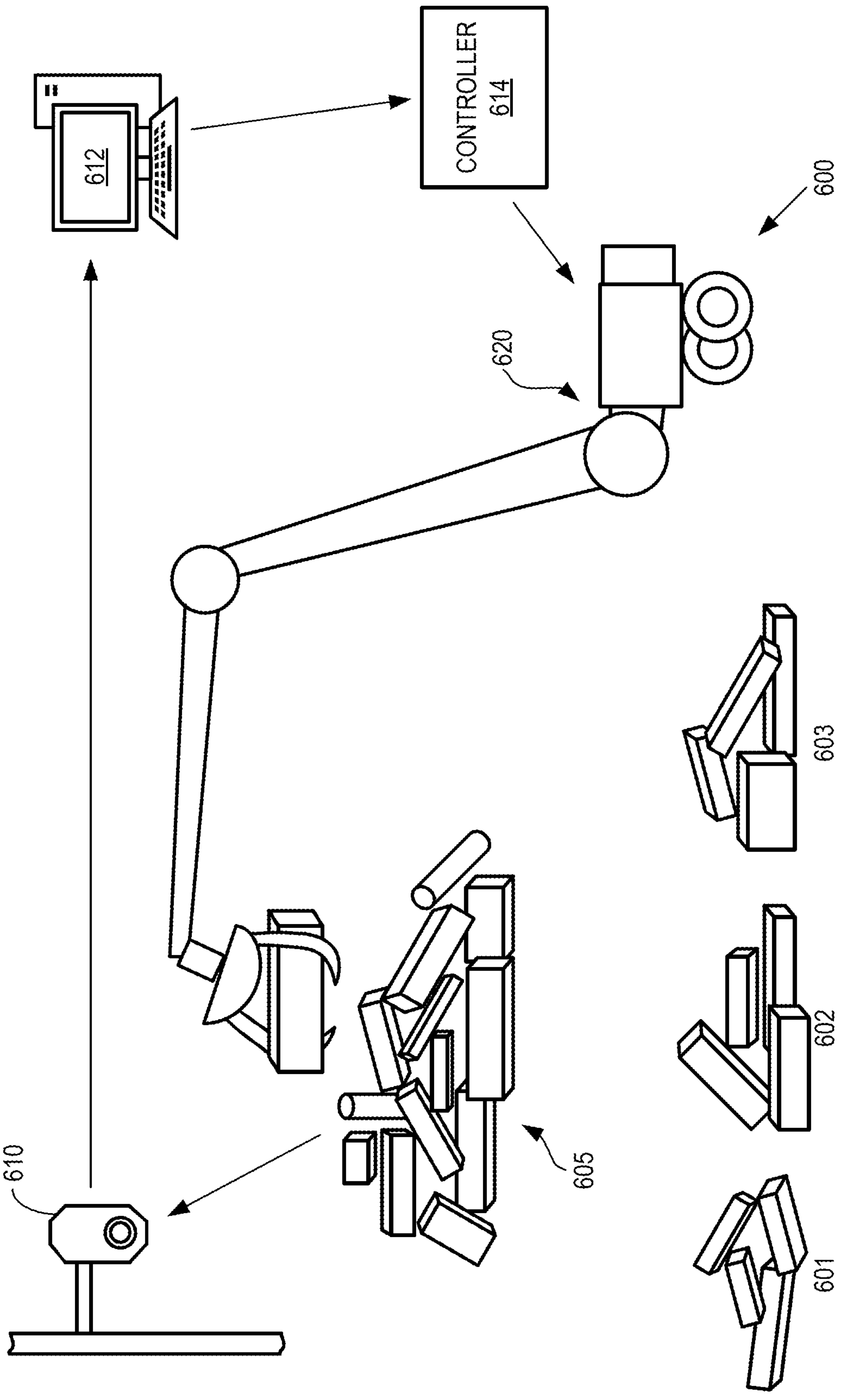
FIG. 6 schematically illustrates an apparatus configured in accordance with embodiments of the present disclosure for classifying/identifying and/or sorting/separating materials that have been collected into one or more heaps, such as metal scrap in a scrap yard.

Referring now to FIG. 6, there is illustrated a simplified diagram of an apparatus 600 configured in accordance with embodiments of the present disclosure for classifying/identifying and/or separating material pieces that have been collected into one or more heaps, such as metal scrap pieces in a scrap yard (e.g., see FIG. 4). For purposes of describing embodiments of the present disclosure, the material pieces will be various metal (e.g., steel) alloy pieces of different chemical compositions. FIG. 6 depicts metal alloy pieces collected in a heap of these metal alloy pieces denoted by the metal alloy heap 605 in which the different metal alloy pieces may be mixed in a random manner within the metal alloy heap 605. The metal alloy heap 605 may be located within a warehouse or in a scrap yard, such as depicted in FIG. 4.

A camera 610 may be mounted (e.g., on a pole or a wall of a building) within a vicinity of the metal alloy heap 605 in order to capture images and/or videos of the metal alloy pieces in the heap 605. The camera 610 may be similar to the camera 109 described herein with respect to FIG. 1. The image data collected by the camera 610 may be transmitted to the computer system 612 by any appropriate means, including by wired or wireless transmission. The computer system 612 may include a vision system similar to the vision system 110 described herein with respect to FIG. 1. The computer system 612 may be configured to process the image data in accordance with the system and process 300 described herein with respect to FIG. 3 in order to determine the location of each of the metal alloys pieces in the heap 605 relative to each other (or at least the metal alloy pieces that can be visualized by the camera 610 since there may be metal alloy pieces that are so hidden beneath other metal alloy pieces that they cannot be visualized until uncovered), and to then classify/identify which of the metal alloy pieces belong to one or more of the metal alloy classifications.

This location and classification information may then be transmitted to a controller 614, which controls the actions of a separation device 620 to grab/collect and remove from the heap 605 each of the classified metal alloy pieces and then optionally separate them into different metal alloy heaps 601, 602, and 603. The separation device 620 may include any appropriate robotic arm manipulator that can be controlled by the controller 614 to automatically select a particular metal alloy piece in the heap 605 that has been identified by the vision system as belonging to a metal alloy classification, physically grab or pick up by any appropriate means the particular metal alloy piece and remove it from the heap 605. The separation device 600 may also be configured to deposit it into a predetermined location (e.g., one of the metal alloy heaps 601, 602, or 603. An example of a robotic arm is disclosed in K. Alipour et al., "*Point-to-Point Stable Motion Planning of Wheeled Mobile Robots with Multiple Arms for Heavy Object Manipulation,*" 2011 IEEE International Conference on Robotics and Automation, pp. 6162-6167, May 9-13, 2011, which is hereby incorporated by reference herein. Other robotic manipulators that could be used within embodiments of the present disclosure are well-known in the art. Alternatively, the grabber may be a large magnet for physically picking up an identified piece.

The apparatus 600 may be configured to remove a certain classification of metal alloys from the heap 605, or remove all but one or more classifications of metal alloy pieces from the heap 605. Alternatively, the apparatus 600 may be configured to remove one or more certain classifications of metal alloy pieces from the heap 605 and place them in one or more other locations, such as one or more receptacles or bins, or one or more other heaps (e.g., one or more of heaps 601, 602, 603).

As further described herein, training of the vision system may be performed in accordance with various appropriate techniques as disclosed herein so that the vision system is capable of classifying/identifying the different steel alloys using image data from the captured images.

In accordance with certain embodiments of the present disclosure, the camera 610 may be configured with one or more devices for capturing or acquiring images of the material pieces within the heap 605. The devices may be configured to capture or acquire any desired range of wavelengths irradiated or reflected by the material pieces, including, but not limited to, visible, infrared ("IR"), ultraviolet ("UV") light. For example, the camera 610 may be configured with one or more cameras (still and/or video, either of which may be configured to capture two-dimensional, three-dimensional, and/or holographical images) positioned in proximity (e.g., above) the heap 605 so that images of the material pieces are captured (e.g., as image data). Alternative, the camera 610 may include one or more laser lights for illuminating certain pieces and a camera for then capturing images of the illuminated pieces. For example, certain types of plastics can be illuminated with certain wavelengths of light to distinguish them from other types of plastics.

Regardless of the type(s) of sensed characteristics/information captured of the material pieces, the information may then be sent to the computer system 612 to be processed (e.g., by a vision system and an AI system) in order to identify and/or classify each of the material pieces. An AI system may implement any well-known AI system (e.g., Artificial Narrow Intelligence ("ANI"), Artificial General Intelligence ("AGI"), and Artificial Super Intelligence ("ASI")), a machine learning system including one that implements a neural network (e.g., artificial neural network, deep neural network, convolutional neural network, recurrent neural network, autoencoders, reinforcement learning, etc.), a machine learning system implementing supervised learning, unsupervised learning, semi-supervised learning, reinforcement learning, self-learning, feature learning, sparse dictionary learning, anomaly detection, robot learning, association rule learning, fuzzy logic, deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

In accordance with certain embodiments of the present disclosure, certain types of machine learning may be performed in two stages. For example, first, training occurs, which may be performed offline in that the system 100 is not being utilized to perform actual classifying/sorting of material pieces. The system 100 may be utilized to train the machine learning system in that homogenous sets (also referred to herein as control samples) of material pieces (i.e., having the same types or classes of materials, or falling within the same predetermined fraction) are passed through the system 100 (e.g., by a conveyor system 103), and may be collected in a common receptacle (e.g., receptacle 140). Alternatively, the training may include using some other mechanism for collecting sensed information (characteristics) of control sets of material pieces. During this training stage, algorithms within the machine learning system extract features from the captured information (e.g., using image processing techniques well known in the art). Non-limiting examples of training algorithms include, but are not limited to, linear regression, gradient descent, feed forward, polynomial regression, learning curves, regularized learning models, and logistic regression. It is during this training stage that the algorithms within the machine learning system learn the relationships between materials and their features/characteristics (e.g., as captured by the vision system and/or sensor system(s)), creating a knowledge base for later classification of a heterogeneous mixture of material pieces (e.g., by the apparatus 600), which may then be separated by desired classifications. Such a knowledge base may include one or more libraries, wherein each library includes parameters (e.g., neural network parameters) for utilization by the machine learning system in classifying material pieces. For example, one particular library may include parameters configured by the training stage to recognize and classify a particular type or class of material, or one or more material that fall with a predetermined fraction. In accordance with certain embodiments of the present disclosure, such libraries may be inputted into the computer system 612 and then the user of the apparatus 600 may be able to adjust certain ones of the parameters in order to adjust an operation of the apparatus 600 (for example, adjusting the threshold effectiveness of how well the machine learning system recognizes a particular material piece within the heap 605).

Additionally, the inclusion of certain materials in material pieces result in identifiable physical features (e.g., visually discernible characteristics) in materials. As a result, when a plurality of material pieces containing such a particular composition are passed through the aforementioned training stage, the machine learning system can learn how to distinguish such material pieces from others. Consequently, a machine learning system configured in accordance with certain embodiments of the present disclosure may be configured to distinguish between material pieces as a function of their respective material/chemical compositions. For example, such a machine learning system may be configured so that material pieces containing a particular element can be classified/identified as a function of the percentage (e.g., weight or volume percentage) of that element contained within the material pieces.

Figure 2:
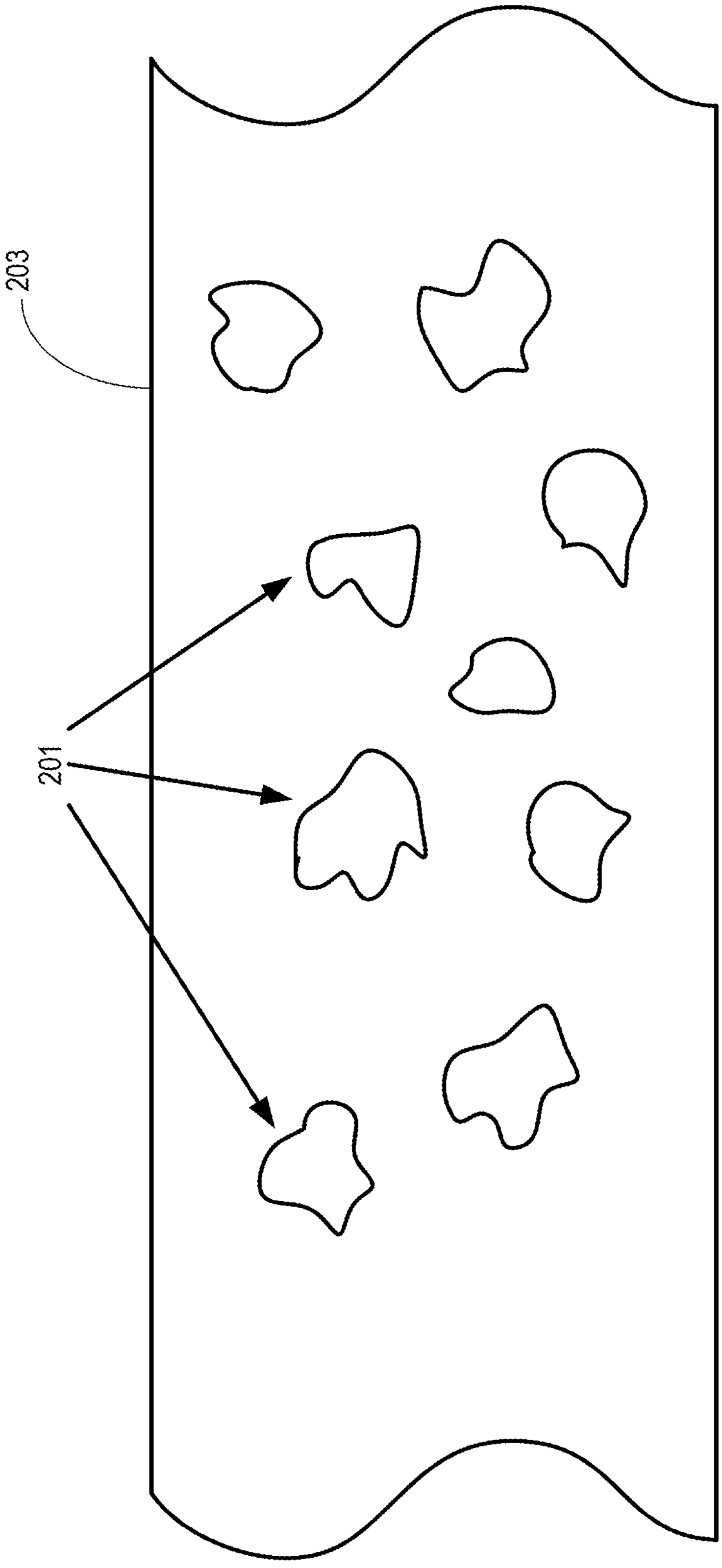
FIG. 2 illustrates an exemplary representation of a control set of material pieces used during a training stage in an artificial intelligence system.

As depicted in FIG. 2, during the training stage, examples of one or more material pieces 201 of a specific class or type of material, which may be referred to herein as a set of one or more control samples, may be delivered past the vision system (e.g., by a conveyor system 203) so that the one or more algorithms within the machine learning system detect, extract, and learn what characteristics or features represent such a type or class of material. Note that the material pieces 201 may be any of the "materials" disclosed herein (e.g., metal alloy pieces representing those that will reside within a heap 605).

For example, each of the material pieces 201 may represent one or more particular types or classes of metal alloy, which are passed through such a training stage so that the one or more algorithms within the machine learning system "learn" (are trained) how to detect, recognize, and classify such material pieces. In the case of training a vision system (e.g., the vision system 110), trained to visually discern (distinguish) between material pieces. This creates a library of parameters particular to such a homogenous class of material pieces. The same process can be performed with respect to images of any classification of material pieces creating a library of parameters particular to such classification of material pieces. For each type of material to be classified by the vision system, any number of exemplary material pieces of that classification of material may be passed by the vision system. Given captured sensed information as input data, the algorithms within the machine learning system may use N classifiers, each of which test for one of N different material types. Note that the machine learning system may be "taught" (trained) to detect any type, class, or fraction of material, including any of the types, classes, or fractions of materials disclosed herein.

After the algorithm(s) have been established and the machine learning system has sufficiently learned the differences for the material classifications (e.g., within a user-defined level of statistical confidence), the libraries of parameters for the different materials may be then implemented into a material classifying and/or separation system (e.g., the apparatus 600) to be used for identifying and/or classifying material pieces from a mixture of material pieces (e.g., within the heap 605), and then possibly separating such classified material pieces as described with respect to FIG. 6.

Techniques to construct, optimize, and utilize a machine learning system are known to those of ordinary skill in the art as found in relevant literature. Examples of such literature include the publications: Krizhev sky et al., "*ImageNet Classification with Deep Convolutional Networks,*" Proceedings of the 25th International Conference on Neural Information Processing Systems, Dec. 3-6, 2012, Lake Tahoe, Nev., and LeCun et al., "*Gradient-Based Learning Applied to Document Recognition,*" Proceedings of the IEEE, Institute of Electrical and Electronic Engineers (IEEE), November 1998, both of which are hereby incorporated by reference herein in their entirety.

It should be understood that the present disclosure is not exclusively limited to machine learning techniques. Other techniques for material classification/identification may also be used. For instance, a vision system may utilize optical spectrometric techniques using multi- or hyper-spectral cameras for the camera 610 to provide a signal that may indicate the presence or absence of a type of material (e.g., containing one or more particular elements) by examining the spectral emissions of the material. Photographs of a material piece may also be used in a template-matching algorithm, wherein a database of images is compared against an acquired image to find the presence or absence of certain types of materials from that database. A histogram of the captured image may also be compared against a database of histograms. Similarly, a bag of words model may be used with a feature extraction technique, such as scale-invariant feature transform ("SIFT"), to compare extracted features between a captured image and those in a database. In accordance with certain embodiments of the present disclosure, instead of utilizing a training stage whereby control samples of material pieces are passed by the vision system, training of the machine learning system may be performed utilizing a labeling/annotation technique (or any other supervised learning technique) whereby as data/information of material pieces are captured by a vision system, a user inputs a label or annotation that identifies each material piece, which is then used to create the library for use by the machine learning system when classifying material pieces within a heterogenous mixture of material pieces (e.g., a heap 605). In other words, a previously generated knowledge base of characteristics captured from one or more samples of a class of materials may be accomplished by any of the techniques disclosed herein, whereby such a knowledge base is then utilized to automatically classify materials.

Therefore, as disclosed herein, certain embodiments of the present disclosure provide for the identification/classification of one or more different materials in order to separate the material pieces in the heap 605 from each other. In accordance with certain embodiments, machine learning techniques may be utilized to train (i.e., configure) a neural network to identify a variety of one or more different classes or types of materials.

One point of mention here is that, in accordance with certain embodiments of the present disclosure, the collected/captured/detected/extracted features/characteristics of the material pieces may not be necessarily simply particularly identifiable physical characteristics; they can be abstract formulations that can only be expressed mathematically, or not mathematically at all; nevertheless, the machine learning system may be configured to parse all of the data to look for patterns that allow the control samples to be classified during the training stage. Furthermore, the machine learning system may take subsections of captured information of a material piece and attempt to find correlations between the pre-defined classifications.

It should be noted that a person of ordinary skill in the art will be able to distinguish the machine learning systems described herein from a machine vision apparatus or system. As the term has been previously used in the industry, an electronic machine vision apparatus is commonly employed in conjunction with an automatic machining, assembly and inspection apparatus, particularly of the robotics type. Television cameras are commonly employed to observe the object being machined, assembled, read, viewed, or inspected, and the signal received and transmitted by the camera can be compared to a standard signal or database to determine if the imaged article is properly machined, finished, oriented, assembled, determined, etc. A machine vision apparatus is widely used in inspection and flaw detection applications whereby inconsistencies and imperfections in both hard and soft goods can be rapidly ascertained and adjustments or rejections instantaneously effected. A machine vision apparatus detects abnormalities by comparing the signal generated by the camera with a predetermined signal indicating proper dimensions, appearance, orientation, or the like. See International Published Patent Application WO 99/2248, which is hereby incorporated by reference herein. Nevertheless, machine vision systems do not perform any sort of further data processing (e.g., image processing) that would include further processing of the captured information through an algorithm. See definition of Machine Vision in Wikipedia, which is hereby incorporated by reference herein. Therefore, it can be readily appreciated that a machine vision apparatus or system does not further include any sort of algorithm, such as a machine learning algorithm. Instead, a machine vision system essentially compares images of parts to templates of images.

Figure 3:
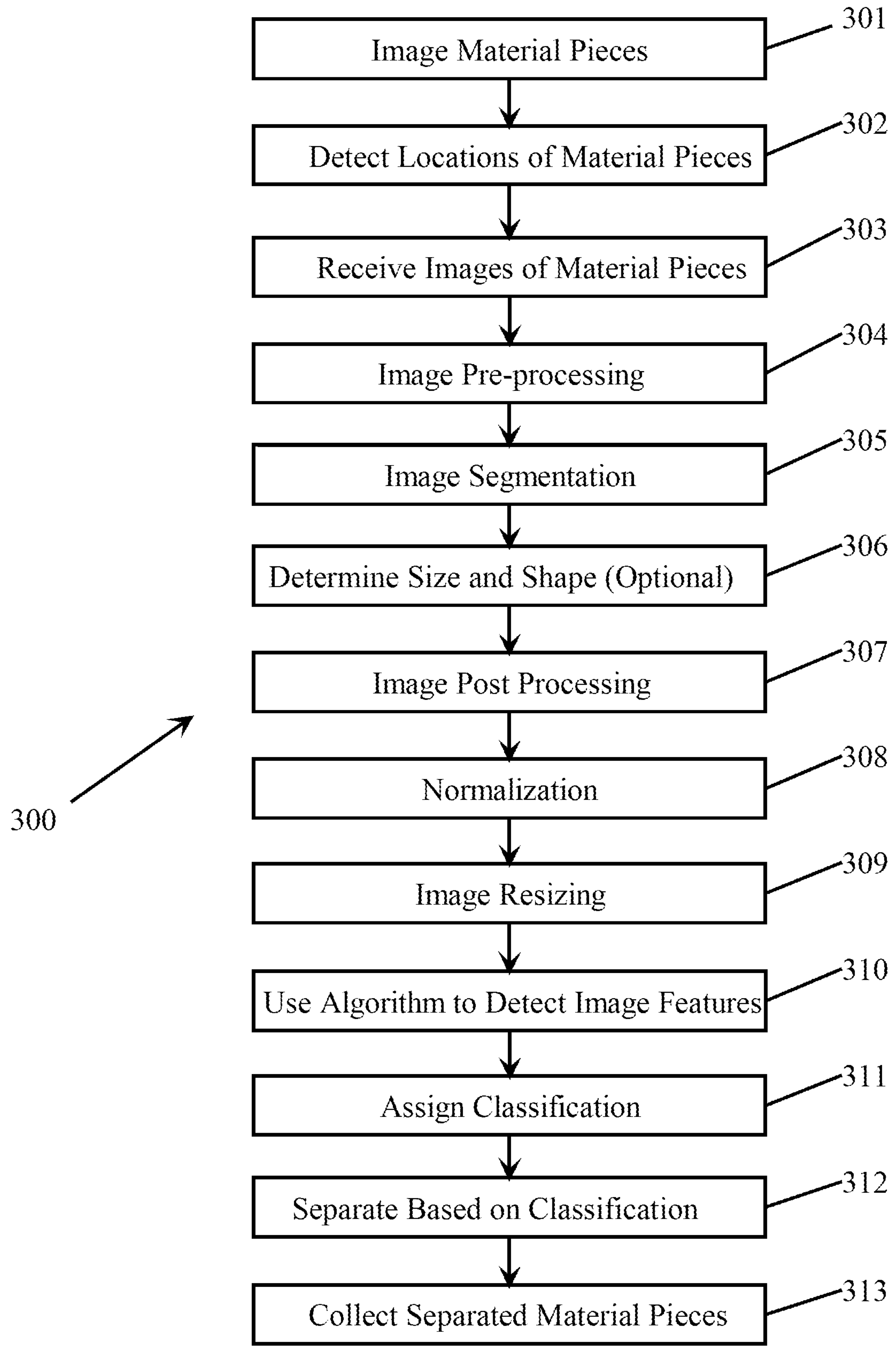
FIG. 3 illustrates a flowchart diagram configured in accordance with embodiments of the present disclosure.

FIG. 3 illustrates a flowchart diagram depicting exemplary embodiments of a process 300 for classifying/identifying and then separating material pieces utilizing a vision system in accordance with certain embodiments of the present disclosure. The process 300 may be configured to operate within any of the embodiments of the present disclosure described herein, including the system 100 of FIG. 1 and the apparatus 600 of FIG. 6. For example, the process 300 may be utilized in the system 100 in order to train a machine learning system as described herein. In such an instance, the process blocks 302, 306, 312, and/or 313 may not be utilized. Furthermore, the process 300 may be utilized in the apparatus 600 in order to remove/separate material pieces from a heap 605 as described herein. In such an instance, the process block 306 may not be utilized.

Operation of the process 300 may be performed by hardware and/or software, including within a computer system (e.g., computer system 3400 of FIG. 5) controlling the system (e.g., the computer system 107, the vision system 110, and/or the vision system implemented within the computer system 612). In the process block 301, images of the material pieces are taken with a camera (e.g., the camera 109, the camera 610). In the process block 302, the location in the heap 605 of each material piece is detected by the vision system for identifying the location of each material piece to be classified/identified. In the process block 303, sensed information/characteristics of the material piece is captured/acquired from the images by the vision system. In the process block 304, the vision system (e.g., the vision system 110, or as implemented within the computer system 612), such as previously disclosed, may perform pre-processing of the captured information, which may be utilized to detect (extract) each of the material pieces (e.g., from the background (e.g., the other material pieces in the heap 605); in other words, the pre-processing may be utilized to identify the difference between the material piece and the background). Well-known image processing techniques such as dilation, thresholding, and contouring may be utilized to identify the material piece as being distinct from the background. In the process block 305, segmentation may be performed. For example, the captured information may include information pertaining to one or more material pieces. Therefore, it may be desired in such instances to isolate the image of an individual material piece from the background of the image. In an exemplary technique for the process block 305, a first step is to apply a high contrast of the image; in this fashion, background pixels are reduced to substantially all black pixels, and at least some of the pixels pertaining to the material piece are brightened to substantially all white pixels. The image pixels of the material piece that are white are then dilated to cover the entire size of the material piece. After this step, the location of the material piece is a high contrast image of all white pixels on a black background. Then, a contouring algorithm can be utilized to detect boundaries of the material piece. The boundary information is saved, and the boundary locations are then transferred to the original image. Segmentation is then performed on the original image on an area greater than the boundary that was earlier defined. In this fashion, the material piece is identified and separated from the background. In accordance with embodiments of the present disclosure, the process block 305 may implement an image segmentation process, such as Mask R-CNN.

In the optional process block 306, the size and/or shape of the material pieces may be determined. In the process block 307, post processing may be performed. Post processing may involve resizing the captured information/data to prepare it for use in the neural networks. This may also include modifying certain properties (e.g., enhancing image contrast, changing the image background, or applying filters) in a manner that will yield an enhancement to the capability of the machine learning system to classify the material pieces. In the process block 309, the data may be resized. Data resizing may be desired under certain circumstances to match the data input requirements for certain machine learning systems, such as neural networks. For example, neural networks may require much smaller image sizes (e.g., 225×255 pixels or 299×299 pixels) than the sizes of the images captured by typical digital cameras. Moreover, the smaller the input data size, the less processing time is needed to perform the classification.

In the process blocks 310 and 311, for each material piece, the type or class of material is identified/classified based on the sensed/detected features. For example, the process block 310 may be configured with a neural network employing one or more machine learning algorithms, which compare the extracted features with those stored in the knowledge base generated during the training stage, and assigns the classification with the highest match to each of the material pieces based on such a comparison. The algorithms of the machine learning system may process the captured information/data in a hierarchical manner by using automatically trained filters. The filter responses are then successfully combined in the next levels of the algorithms until a probability is obtained in the final step. In the process block 311, these probabilities may be used for each of the N classifications (e.g., to decide into which of N separate heaps 601 . . . 603 the respective material pieces should be sorted). For example, each of the N classifications may be assigned to one of the heaps 601 . . . 603, and the material piece under consideration is removed from the heap 605 and placed into that heap that corresponds to the classification returning the highest probability larger than a predefined threshold. Within embodiments of the present disclosure, such predefined thresholds may be preset by the user. A particular material piece may be sorted into an outlier heap if none of the probabilities is larger than the predetermined threshold.

Next, in the process block 312, the separation device 620 is activated via the controller 614 to pick up or grab the classified/identified material piece and remove it from the heap 605. In the process block 313, the separation device 620 may then place the classified/identified material piece into the appropriate one of the heaps 601 . . . 603.

The vision system may be adjusted to compensate for different environmental conditions by which images of the material pieces are obtained, such as different durations of time for which the material pieces have been in the scrap yard, amount of dirt on the material pieces, different weather conditions (e.g., snow, rain, sunlight), material pieces sprayed with and without water mixed with chemicals/detergents, and material pieces obtained from different sources.

FIG. 1 illustrates an example of a material handling system 100, which may be configured in accordance with various embodiments of the present disclosure to train a machine learning system implemented within the computer 612 to classify/identify different types/classes of materials, such as different metal alloys.

A conveyor system 103 may be implemented to convey individual (i.e., physically separable) material pieces 101 through the system 100 so that each of the individual material pieces 101 can be classified into predetermined desired groups. Such a conveyor system 103 may be implemented with one or more conveyor belts (e.g., the conveyor belts 102, 103) on which the material pieces 101 travel, typically at a predetermined constant speed. However, certain embodiments of the present disclosure may be implemented with other types of conveyor systems.

The conveyor belt 103 may be a conventional endless belt conveyor employing a conventional drive motor 104 suitable to move the conveyor belt 103 at the predetermined speeds. In accordance with certain embodiments of the present disclosure, some sort of suitable feeder mechanism may be utilized to feed the material pieces 101 onto the conveyor belt 103, whereby the conveyor belt 103 conveys the material pieces 101 past various components within the system 100. Within certain embodiments of the present disclosure, the conveyor belt 103 is operated to travel at a predetermined speed by a conveyor belt motor 104. A belt speed detector 105 (e.g., a conventional encoder) may be operatively coupled to the conveyor belt 103 to provide information corresponding to the movement (e.g., speed) of the conveyor belt 103.

In accordance with certain embodiments of the present disclosure, after the material pieces 101 are received by the conveyor belt 103, a tumbler and/or a vibrator may be utilized to separate the individual material pieces from a collection of material pieces, and then they may be positioned into one or more singulated (i.e., single file) streams. In accordance with alternative embodiments of the present disclosure, the material pieces may be positioned into one or more singulated (i.e., single file) streams, which may be performed by an active or passive singulator 106. An example of a passive singulator is further described in U.S. Pat. No. 10,207,296. As previously discussed, incorporation or use of a singulator is not required. Instead, the conveyor system (e.g., the conveyor belt 103) may simply convey a collection of material pieces, which have been deposited onto the conveyor belt 103, in a random manner.

The vision system 110 may utilize one or more still or live action cameras 109 to collect or capture information about each of the material pieces 101. For example, the vision system 110 may be configured (e.g., with a machine learning system) to collect or capture any type of information that can be utilized within the system 100 to selectively classify the material pieces 101 as a function of a set of one or more (user-defined) physical characteristics, including, but not limited to, color, hue, size, shape, texture, overall physical appearance, uniformity, composition, and/or manufacturing type of the material pieces 101. The vision system 110 captures images of each of the material pieces 101 (including one-dimensional, two-dimensional, three-dimensional, or holographic imaging), for example, by using an optical sensor as utilized in typical digital cameras and video equipment. Such images captured by the optical sensor are then stored in a memory device as image data. In accordance with certain embodiments of the present disclosure, such image data represents images captured within optical wavelengths of light (i.e., the wavelengths of light that are observable by a typical human eye). However, alternative embodiments of the present disclosure may utilize sensors that are capable of capturing an image of a material made up of wavelengths of light outside of the visual wavelengths of the typical human eye. This captured image data is then utilized to classify the control sets of material pieces so that the machine learning system is trained (as described herein) for each different type of material to be separated by the apparatus 600.

Figure 5:
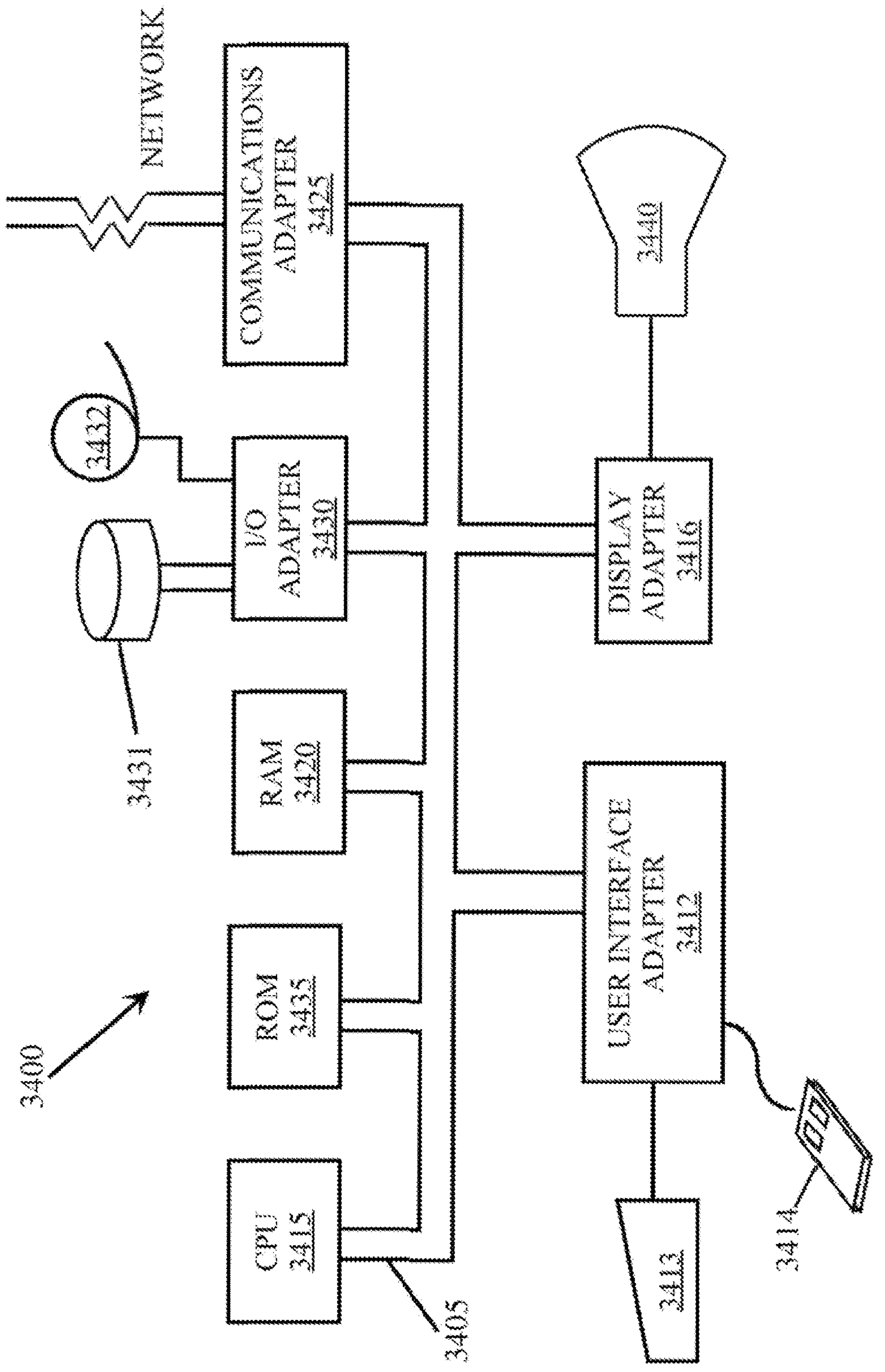
FIG. 5 illustrates a block diagram of a data processing system configured in accordance with embodiments of the present disclosure.

With reference now to FIG. 5, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 107, the computer system 612, and/or the vision system 110 may be configured similarly as the computer system 3400. The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem/router (not shown), and additional memory (not shown). The I/O adapter 3430 may provide a connection for a hard disk drive 3431, a tape drive 3432, and a CD-ROM drive (not shown).

One or more operating systems may be run on the one or more processors 3415 and used to coordinate and provide control of various components within the computer system 3400. In FIG. 5, the operating system(s) may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, any of the processes of the present disclosure may be applied to a multiprocessor computer system, or performed by a plurality of such systems 3400. For example, training of the vision system 110 may be performed by a first computer system 3400, while operation of the computer system 612 for classifying may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 5 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

As has been described herein, embodiments of the present disclosure may be implemented to perform the various functions described for identifying, locating, classifying, and/or separating material pieces. Such functionalities may be implemented within hardware and/or software, such as within one or more data processing systems (e.g., the data processing system 3400 of FIG. 5), such as the previously noted computer system 107, the vision system 110, and/or the computer system 612. Nevertheless, the functionalities described herein are not to be limited for implementation into any particular hardware/software platform.

As will be appreciated by one skilled in the art, aspects of the present disclosure may be embodied as a system, process, method, program product and/or apparatus. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

The flowchart and block diagrams in the figures illustrate architecture, functionality, and operation of possible implementations of systems, methods, processes, program products, and apparatuses according to various embodiments of the present disclosure. In this regard, each block in the flowcharts or block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors (e.g., CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

In the description herein, a flow-charted technique may be described in a series of sequential actions. The sequence of the actions, and the element performing the actions, may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), and can also be performed in whole, in part, or any combination thereof.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing. Such configured devises are physically designed to perform the specified function or functions.

To the extent not described herein, many details regarding specific materials, processing acts, and circuits are conventional, and may be found in textbooks and other sources within the computing, electronics, and software arts.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, programming languages such as MATLAB or LabVIEW, or any of the machine learning software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the machine learning system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider). As an example of the foregoing, various aspects of the present disclosure may be configured to execute on one or more of the computer system 107, the vision system 110, and the computer system 612.

In accordance with alternative embodiments of the present disclosure, instead of, or in addition to, utilization of a camera 610 and associated vision system, a sensor device may be utilized to classify each of the material pieces in a heap 605. Such a sensor device may be mounted somewhere on the separation device 600, such as the arm or the grabbing mechanism of a robotic manipulator.

A sensor device may be configured with any type of sensor technology, including sensors utilizing irradiated or reflected electromagnetic radiation (e.g., utilizing infrared ("IR"), Fourier Transform IR ("FTIR"), Forward-looking Infrared ("FLIR"), Very Near Infrared ("VNIR"), Near Infrared ("NIR"), Short Wavelength Infrared ("SWIR"), Long Wavelength Infrared ("LWIR"), Medium Wavelength Infrared ("MWIR" or "MIR"), X-Ray Transmission ("XRT"), Gamma Ray, Ultraviolet ("UV"), X-Ray Fluorescence ("XRF"), Laser Induced Breakdown Spectroscopy ("LIBS"), Raman Spectroscopy, Anti-stokes Raman Spectroscopy, Gamma Spectroscopy (which can be utilized to sense objects that are obscured by other objects, such as in a heap), Hyperspectral Spectroscopy (e.g., any range beyond visible wavelengths), Acoustic Spectroscopy, NMR Spectroscopy, Microwave Spectroscopy, Terahertz Spectroscopy, including one-dimensional, two-dimensional, or three-dimensional imaging with any of the foregoing), or by any other type of sensor technology, including but not limited to, chemical or radioactive. Implementation of an XRF system is further described in U.S. Pat. No. 10,207,296.

The following sensor systems may also be used within certain embodiments of the present disclosure for determining the chemical signatures of plastic pieces and/or classifying plastic pieces. The previously disclosed various forms of infrared spectroscopy may be utilized to obtain a chemical signature specific of each plastic piece that provides information about the base polymer of any plastic material, as well as other components present in the material (mineral fillers, copolymers, polymer blends, etc.). Differential Scanning calorimetry ("DSC") is a thermal analysis technique that obtains the thermal transitions produced during the heating of the analyzed material specific for each material. Thermogravimetric analysis ("TGA") is another thermal analysis technique resulting in quantitative information about the composition of a plastic material regarding polymer percentages, other organic components, mineral fillers, carbon black, etc. Capillary and rotational rheometry can determine the rheological properties of polymeric materials by measuring their creep and deformation resistance. Optical and scanning electron microscopy ("SEM") can provide information about the structure of the materials analyzed regarding the number and thickness of layers in multilayer materials (e.g., multilayer polymer films), dispersion size of pigment or filler particles in the polymeric matrix, coating defects, interphase morphology between components, etc. Chromatography (e.g., LC-PDA, LC-MS, LC-LS, GC-MS, GC-FID, HS-GC) can quantify minor components of plastic materials, such as UV stabilizers, antioxidants, plasticizers, anti-slip agents, etc., as well as residual monomers, residual solvents from inks or adhesives, degradation substances, etc.

In the descriptions herein, numerous specific details are provided, such as examples of programming, software modules, user selections, network transactions, database queries, database structures, hardware modules, hardware circuits, hardware chips, controllers, robotic manipulators, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Those skilled in the art having read this disclosure will recognize that changes and modifications may be made to the embodiments without departing from the scope of the present disclosure. It should be appreciated that the particular implementations shown and described herein may be illustrative of the disclosure and its best mode and may be not intended to otherwise limit the scope of the present disclosure in any way. Other variations may be within the scope of the following claims.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms (such as acronyms used for chemical elements within the periodic table) used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

The term "coupled," as used herein, is not intended to be limited to a direct coupling or a mechanical coupling. Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus comprising:
- a camera configured to capture images of individual metal alloy pieces contained within a first heap of a heterogeneous mixture of metal alloy pieces comprising at least one metal alloy piece having a first metal alloy composition and at least one metal alloy piece having a second metal alloy composition;
- a data processing system implemented with an artificial intelligence ("AI") system configured to assign a first classification to a first metal alloy piece having the first metal alloy composition as a function of a processing of the captured image of the first metal alloy piece through the AI system; and
- a separation device configured to automatically grab and remove the first metal alloy piece from the first heap in response to the first classification.

2. The apparatus as recited in claim 1, wherein the separation device is configured to deposit the first metal alloy piece on a second heap of metal alloy pieces.

3. The apparatus as recited in claim 2, wherein the second heap consists of metal alloy pieces having the first metal alloy composition.

4. The apparatus as recited in claim 2, wherein the AI system is configured to assign a second classification to a second metal alloy piece having the second metal alloy composition as a function of a processing of the captured image of the second metal alloy piece through the AI system, wherein the separation device is configured to automatically grab and remove the second metal alloy piece from the first heap in response to the second classification, wherein the separation device is configured to deposit the second metal alloy piece on a third heap of metal alloy pieces.

5. The apparatus as recited in claim 4, wherein the third heap is a homogenous collection of metal alloy pieces having the second metal alloy composition.

6. The apparatus as recited in claim 1, wherein the artificial intelligence system is configured with a neural network employing one or more algorithms that compare features detected in the captured images with those stored in a knowledge base generated during a training stage, wherein during the training stage, the one or more algorithms learn relationships between one or more specified classes of metal alloys and their features extracted from captured image data that creates the knowledge base.

7. The apparatus as recited in claim 1, wherein the camera is configured to capture visual images of the individual metal alloy pieces.

8. The apparatus as recited in claim 1, wherein the first metal alloy piece is a steel alloy piece.

9. The apparatus as recited in claim 2, wherein the separation device is a robotic arm having a controller receiving instructions from the data processing system identifying a first location of the first metal alloy piece within the first heap, and identifying a second location of the second heap.

10. The apparatus as recited in claim 9, wherein the first and second heaps are located within a metal scrap yard.

11. An apparatus comprising:
- a sensor configured to capture one or more characteristics of each of a mixture of material pieces contained within a first heap of material pieces, wherein the mixture of material pieces comprises material pieces having different chemical compositions;

a data processing system configured to assign a first classification to a first material piece having a first chemical composition as a function of a processing of the captured one or more characteristics of the first material piece; and a separation device configured to automatically grab and remove the first material piece from the first heap in response to the first classification.

12. The apparatus as recited in claim 11, wherein the separation device is a robotic arm having a controller receiving instructions from the data processing system identifying a first location of the first material piece within the first heap, and identifying a second location of the second heap, wherein the sensor is an x-ray fluorescence system mounted on an arm of the separation device.

13. The apparatus as recited in claim 11, wherein the sensor is a camera is configured to capture visual images of the material pieces, and wherein the data processing system is implemented with an artificial intelligence ("AI") system configured to assign a first classification to a first material piece having a first chemical composition as a function of a processing of the captured visual image of the first material piece through the AI system.

14. The apparatus as recited in claim 13, wherein the AI system is configured to assign a second classification to a second material piece having a second chemical composition as a function of a processing of the captured visual image of the second material piece through the AI system, wherein the separation device is configured to automatically grab and remove the second material piece from the first heap in response to the second classification, wherein the first and second classifications are different from each other, wherein the separation device is configured to deposit the first material piece on a second heap of material pieces, wherein the separation device is configured to deposit the second material piece on a third heap of material pieces.

15. The apparatus as recited in claim 14, wherein the second heap is a homogenous collection of material pieces having the first chemical composition, wherein the third heap is a homogenous collection of material pieces having the second chemical composition.

16. The apparatus as recited in claim 13, wherein the material pieces are scrap metal alloy pieces and the first material piece is a first scrap metal alloy piece, wherein the first and second heaps are located within a metal scrap yard, wherein the separation device is configured to deposit the first scrap metal alloy piece on a second heap of scrap metal alloy pieces.

17. The apparatus as recited in claim 16, wherein the separation device is a robotic arm having a controller receiving instructions from the data processing system identifying a first location of the first scrap metal alloy piece within the first heap, and identifying a second location of the second heap.

18. The apparatus as recited in claim 17, wherein the AI system is configured with a neural network employing one or more algorithms that compare features detected in the captured images with those stored in a knowledge base generated during a training stage, wherein during the training stage, the one or more algorithms learn relationships between one or more specified classes of scrap metal alloys and their features extracted from captured image data that creates the knowledge base.

19. The apparatus as recited in claim 1, wherein the first heap of a heterogeneous mixture of metal alloy pieces is a mound of the metal alloy pieces lying one on top of another.

20. The apparatus as recited in claim 11, wherein the first heap of material pieces is a mound of the material pieces lying one on top of another.

* * * * *